May 23, 1950     H. D. LATHROP ET AL     2,509,003
PROCESS FOR WASHING CONTAINERS
Filed Jan. 8, 1942
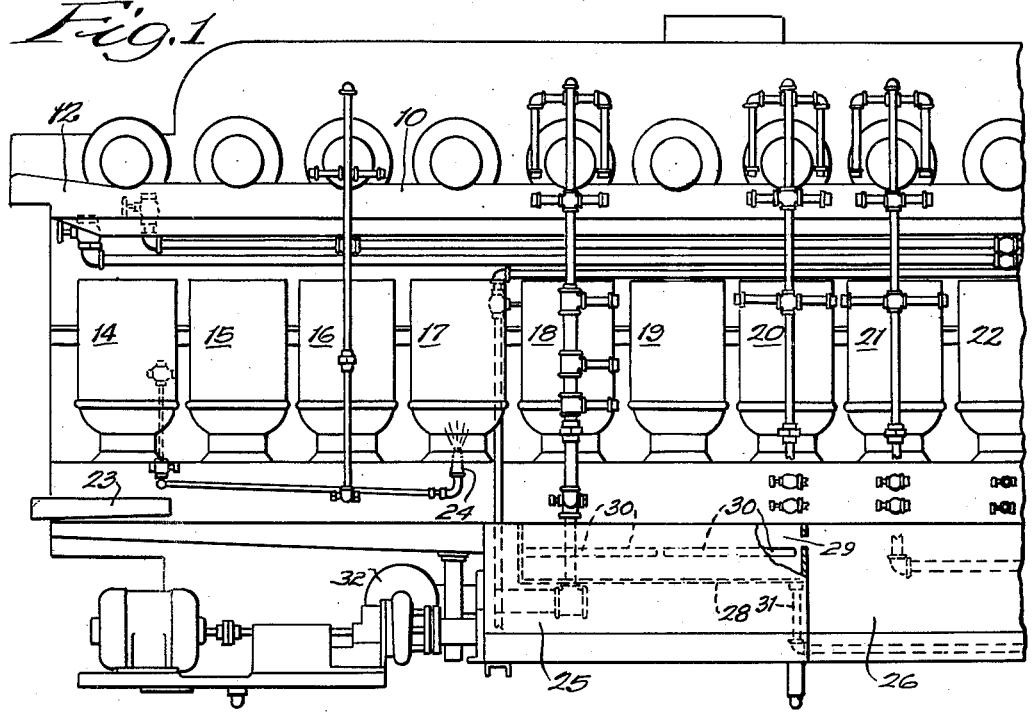
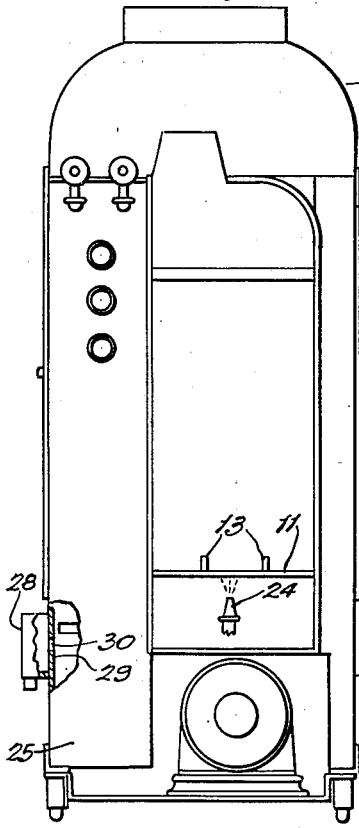
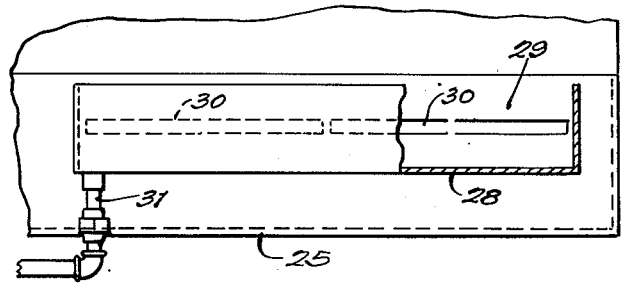
Inventors:
Harry D. Lathrop
and Vergil Schwarzkopf,
By Dawson, Ooms & Booth,
Attorneys.

Patented May 23, 1950

2,509,003

UNITED STATES PATENT OFFICE 2,509,003

PROCESS FOR WASHING CONTAINERS

Harry D. Lathrop, Chicago, and Vergil Schwarzkopf, La Grange, Ill., assignors to The Lathrop-Paulson Company, Chicago, Ill., a corporation of Illinois Application January 8, 1942, Serial No. 426,011

8 Claims. (Cl. 134—23)

This invention relates to a process for washing containers, and is particularly useful in the treating and cleansing of milk cans and the like.

In the practice heretofore employed in washing milk cans and similar containers, wash water has been recycled continuously after being brought into contact with the interiors of the containers, replacement water for that lost or withdrawn being added from time to time. Alkali or other treating materials have been used to increase the cleansing property of the water, and by reason of the reuse of the water and the retaining of it within the reservoir, the effectiveness of the added ingredients diminishes as the operation proceeds. It has long been desired in this field to find a process wherein substantially fresh wash water or wash water as effective as fresh water with respect to the active ingredients therein, may be constantly replenished and used without a diminution of its effectiveness. It has also been desired for a long period to eliminate contaminating materials, such as milk fats, milk stone, etc., and prevent their being again brought into contact with the interior can surfaces while at the same time reusing the water.

An object of the present invention is to provide a process wherein wash water may be replenished and reused with the same effect as its original use as far as the ingredients thereof are concerned while at the same time eliminating constantly from the system undesirable substances, such as milk fats, milk stone, water stone, foreign material, objectionable odors, molds, yeasts, bacteria, etc. A further object is to provide a method which is substantially automatic in operation, constantly bringing into play against the interior and exterior surfaces of the containers a recycled washing fluid which has lost none of its effectiveness and which does not contain undesirable ingredients removed from the can interiors and exteriors during the operation. Other specific objects and advantages will appear as the specification proceeds.

Apparatus with which the new method may be employed is set forth in the accompanying drawing, in which—

Figure 1 is a broken side view in elevation of apparatus for washing cans and covers and with which our new method may be carried out; Fig. 2, a front view in elevation, a portion of the casing being broken away to show the overflow tank and the nozzle at station 16 being removed to show the nozzle at station 17; and Fig. 3, a broken side detail view showing the overflow tank through which foam and the contained material is carried away.

In the practice of our invention, we prefer to employ a wash water reservoir from which wash water may be withdrawn for spraying into the interiors and upon the exteriors of containers and returned from thence to the reservoir. To the water within the reservoir, we prefer to add certain ingredients which give the water a detergent and foaming effect and which also tend to combine with or envelop milk fats and other impurities and to carry them to the surface of the water when they return to the reservoir. Any suitable foam-forming materials having these effects may be employed. It is important that the combination produced by such materials with the fats or the mixture formed by the envelopment of the fat and other undesirable constituents be lighter in weight than water, or at least intimately mixed with foam so that they are supported thereby upon the surface of the water.

To the reservoir, as above described, containing a washing liquid and, after operation, a layer of foam and undesirable foreign material upon the top of the liquid, we add a definite increment of water and treating material so as to cause an overflow of the foam body and top layer, while at the same time maintaining the washing liquid in proper condition for further treatment. If desired, the foam body and layer may be removed by skimming or by other suitable means. We prefer, however, to employ the automatic step of overflow in order to eliminate constantly the foam body and layer and also, if desired, to provide a pretreating step for the can interiors in which the freshly-introduced liquid is sprayed into the cans before they reach the main washing position. If desired, the exteriors of the cans may be treated in the same manner.

Broadly, our process consists in washing successively a series of containers with a wash water containing ingredients giving it a foam-forming effect and the property of entering into combination with or envelopment of fats and other milk fractions whereby such materials are caused to float upon the surface of the washing water reservoir, constantly adding fresh water and sufficient cleaning and emulsifying ingredients to maintain a balanced washing solution while producing an overflow of the foam body and a layer upon the liquid level, while withdrawing wash water for treating the cans from a point below the foam layer.

The spraying operation is carried on in the usual manner, the cans being inverted and resting upon their open necks. The wash water is sprayed upwardly into the open necks and into the interior and onto the exterior of the cans, the spraying operation automatically creating a foam in addition to washing the cans. The foam so formed is carried downwardly by the water stream and the water and foam returned in a stream or by any means to the main pool or reservoir of washing liquid.

Any suitable material for combining with milk fats and other milk ingredients and impurities or for enveloping the same to form a floating layer and for producing a foam body sufficient to support such materials upon the liquid may be employed. Since such materials are well known to those skilled in the art, it is believed unnecessary to describe them in detail. The ingredients may be alkali or acid, as desired.

A suitable acid-cleaning solution, which may be employed, comprises, in addition to the water employed, an enzyme, such as pepsin, gluconic acid, for imparting the definite acid reaction, lecithin as the emulsifier for fat substances, and a wetting agent which may have emulsifying and enveloping properties, such as sulphonated alcohol or sulphonated petroleum fractions. In such an aqueous washing solution, there may be one part lecithin, nine parts pepsin, about 2% of wetting agent, and a sufficient acid to carry the pH on the acid side, e. g., 6.4. In view of the fact that detergents are known which, in the washing of the cans, will give a foaming effect while emulsifying or combining with the fat, it is believed unnecessary to give examples or a detailed statement of proportions. Any suitable solution of this type which combines with or emulsifies fat and produces a foam body, maintaining the removed fat and impurities in a body upon the top of the wash liquid, may be employed.

The foam-forming and treating ingredients are added to the reservoir in such proportion as to make all of the wash water therein foam-forming in character so that when such water is sprayed under pressure into the interior and onto the exterior of the cans for the cleansing operation, it automatically produces a foam body which carries the fat and other impurities as above described. In adding an increment of water and fresh ingredients for the purpose of producing an overflow and an elimination of the foam body and layer, it is important to add ingredients combined with the fresh water so as to maintain the foam-forming quality of the wash water within the reservoir.

The fresh water used to replenish the wash water may be introduced from any source. It is often desirable to return a portion of the hot rinse water used in a succeeding operation or from a preceding operation. The ingredients may be added at any point in the treating process.

While the ingredients may be introduced as desired into the reservoir, we much prefer to introduce them into freshly emptied cans as a pretreating step and just prior to the main washing step in which wash water is withdrawn from the reservoir below the foam level thereof and introduced into the can. We find that the pretreating step just described, in which the fresh ingredients are given an opportunity to meet and combine with or envelop the fats and other impurities, is effective in preparing the can interior or exterior for the quick removal of such fats and impurities when it reaches the main washing step. Such pretreating provides a time interval in which the combination with, envelopment or emulsifying of the fats, milk solids, or impurities is carried through to the desired degree, enabling the resulting compounds to be readily removed upon being struck by the wash water. The ingredients employed in the pretreating step are carried to the reservoir tank and together with the make-up water result in an overflow of the top layer carried by the liquid level. The overflow may pass through a longitudinal slot adjacent the upper level of the liquid or it may overflow from any open edge provided by the tank. The foamy material thus withdrawn may, if desired, be used for washing the exteriors of the cans or for any purpose.

With the above-described process, it is found that the wash water need not be drawn off for replenishing as a whole, but may be constantly used with the effectiveness of fresh wash water while the undesirable ingredients which ordinarily contaminate wash water are automatically removed. The process is extremely simple, enabling washing to be carried on more quickly and effectively with the use of less ingredients and washing liquid. With the present process, it is possible to reuse in the washing tank substantially all of the hot rinse feed water, a considerable portion of which was formerly allowed to go to waste, thus resulting in a saving of heat. In the reuse of the wash water, there is no tendency for a recontamination of surfaces by deposits of milk fats, milk stone, water stone, foreign matter, molds, yeasts, bacteria, etc., because these foreign materials have been removed by overflowing the foam layer at the top of the liquid and because the wash water is withdrawn at a point well below such layer.

After the can leaves the washing station, it is carried to a rinse station, where hot rinse water is applied to the inside and outside of the can, the hot water being preferably returned as a whole to the wash water tank. In the rinsing step, the hot water is delivered under pressure and at a temperature above boiling at atmospheric pressure before releasing it into the can. Following this, the can is subjected to a clear feed water rinse at relatively high temperature, such as, for example, 200° F.

After the rinsing step, the surfaces of the can carry water in bead-like forms which are difficult to dissipate. In order to readily remove these, we apply a very light spray of acid cleaner of the type heretofore described, which diminishes the surface tension and causes the water to flow from the can. By following this operation, it is possible to omit any steam application and still maintain higher temperatures. In the final step, the can is preferably dried with air.

Apparatus is shown in the accompanying drawing with which the new method may be carried out. Such apparatus is old for the most part and need not be described in detail. In the illustration given, 10 designates a frame providing a can track 11 and a can cover track 12. In the operation of such machines, the cans and covers are advanced step-by-step by pivotal pawls carried by reciprocating rails. 13 designates the top portion of pawls employed for advancing the cans, as shown more clearly in Fig. 2. The pawls advance the cans from one station to another and, at the various stations where the cans and covers pause, specific operations, such as draining, washing, rinsing, drying, etc., are carried on. For example, a number of such operating stations are indicated by the numerals 14, 15, 16, 17, 18, 19, 20, 21 and 22. Stations 14 and 15 are usually employed for draining stations, the drained material from station 14 being caught by the drip saver pan 23. Station 16 is usually employed for a cold wash. Station 17 is employed preferably for the application of the foam-forming ingredients herein, as, for example, through nozzle 24, as shown more clearly in Fig. 2. At this station, it is preferred to direct the foam-forming ingredients as a fresh and concentrated solution directly into the can to meet and combine with or envelop the fats and other impurities in the pretreating operation which has already been described and the resulting foam and water pass directly into tank 25. When the can reaches the station 18, it is met by a washing solution from the reservoir tank 25 just below, and the foam-forming ingredients within the can are agitated and removed in a foaming mass, dropping into the reservoir tank 25 therebelow. At station 19, the can is preferably allowed to drain. The rinsing operation with hot water is next carried on at station 20, and the final application of a light spray of the acid cleaner is made at station 22. If desired, two rinsing stations may be used. A single or two rinsing stations 20 and 21 may be used.

It will be understood that in the foregoing can washing station, suitable nozzles are employed at the various stations for introducing the washing liquids and rinsing solutions, etc. In subsequent operations, at the following station 22 the can will be allowed to drain and then will be dried by application of hot air. In step-by-step relation, the can covers above the cans are given exactly the same treatment at each station. In the final well-known operation, the can is inverted and the cover is automatically placed upon the can, and each can with its own cover is moved away by suitable mechanism. In view of the well-known construction of all of the foregoing, it is believed unnecessary to set out a detailed description of such old elements.

In Fig. 2, a portion of the casing is broken away to show the overflow tank, and the nozzle at station 16 is removed to show the nozzle at station 17.

Suitable structure herein, by which the foam overflows from the pool and is removed, is set out in the three figures of the drawing. A foam tank 28 is secured to the side casing 29 of the reservoir tank and communicates with the tank substantially throughout its length through slot 30. A draw-off pipe 31 removes the foam at a later stage and carries it preferably to the rear end of the machine for use in washing the can exteriors.

In the operation of the structure shown in the drawings, the can at station 17 receives the concentrated application of acid cleaner in a pretreating operation in which the ingredients of the solution are permitted to work effectively upon the fats and impurities within the can. The can, upon arrival at station 18, meets a large volume of hot wash water, which produces a large volume of persistent foam which floats with the impurities and fats upon the surface of the liquid. The water below the surface is thus protected from contamination with the fats and other impurities by the foam and is repeatedly used in the washing operations at stations 18 and 19. The foam completely covers the wide surface of the tank and overflows along one side through the slots 30 into a settling tank 28 in which the foam tends to break and the liquid containing some foam is led away through pipe 31.

The pump 32, as indicated in Fig. 1 of the drawing, serves to draw wash liquid from below the surface in tank 25 and to discharge it upwardly through a nozzle into the can at station 18.

It will be understood that while the invention has been described herein in connection with a can, it is also used in connection with the cover of the can and with other types of containers, and may be also used with plastic, metal, and a great variety of other surfaces.

While we have described the invention in connection with certain details and specific steps, it will be understood that those skilled in the art may and will depart from such details and specific steps while still employing the spirit of our invention.

We claim:

1. In a process for washing emptied milk cans containing milk films on the surfaces thereof, the steps of maintaining a pool of wash liquid containing ingredients in proper proportion with the liquid to form with milk solids a foam when agitated, spraying fresh liquid and such foam-forming ingredients onto can surfaces to pretreat the same, collecting the liquid and foam carried thereby and directing the same to said pool, withdrawing wash liquid from said pool below said foam layer and spraying the same onto surfaces of said pretreated can, and returning such used wash liquid and the foam layer produced thereby to said reservoir wherein said foam layer is caused to overflow by the added increment of fresh liquid and foam-forming ingredients.

2. In a process for washing emptied milk cans containing milk films on the surfaces thereof, the steps of maintaining a pool of wash liquid containing ingredients in proper proportion to form with milk solids a foam when agitated, spraying fresh liquid containing such ingredients onto can surfaces for pretreatment, directing the liquid and foam thus produced to said pool where said foam body collects upon the top of said liquid, withdrawing wash liquid from below said top level and introducing the same under pressure onto surfaces of said can, returning such used liquid and the foam produced to said pool, and removing the foam layer from the top of the liquid within said pool.

3. In a process for washing emptied milk cans containing milk components on the surfaces thereof, the steps of maintaining a pool of wash liquid containing ingredients in proper proportion with the liquid to form with milk solids a foam when agitated, spraying liquid containing such foam-forming ingredients onto can surfaces to remove milk components and to form a foam with such ingredients, collecting the liquid and foam carried thereby and directing the same to said pool, withdrawing wash liquid from said pool below said foam layer and spraying the same onto surfaces of said prewashed can, and returning such used wash liquid and the foam layer produced thereby to said reservoir, wherein said foam layer is caused to overflow by the added ingredient of fresh liquid and foam-forming ingredients.

4. In a process for washing emptied milk cans containing milk components on the surfaces thereof, the steps of maintaining a pool of wash liquid containing ingredients in proper proportion to form with milk solids a foam when agitated, spraying liquid containing such ingredients onto can surfaces carrying milk components to form a foam holding said components, directing the liquid and foam, thus produced, to said pool where said foam body collects upon the top of said liquid, withdrawing wash liquid from below said top level and introducing the same under pressure onto surfaces of said can, returning such used liquid and the foam produced to said pool, and removing the foam layer from the top of the liquid within said pool.

5. In a process for washing emptied milk cans containing milk components on the surfaces thereof, the steps of maintaining a pool of wash liquid containing ingredients in proper proportion to form with milk solids a foam when agitated, spraying liquid containing such ingredients onto can surfaces containing such milk components to form a foam therewith, directing the liquid and foam, thus produced, to said pool where said foam body collects upon the top of said liquid, withdrawing wash liquid from below said top level and introducing the same under pressure onto surfaces of said can, returning such used liquid and the foam produced to said pool, rinsing the washed can with fresh liquid and returning rinsing liquid to said pool whereby said foam layer is caused to overflow by the added increment of said liquid.

6. In a process for washing emptied milk cans containing milk components on the surfaces thereof, the steps of maintaining a pool of wash liquid containing ingredients in proper proportion to form with milk solids a foam when agitated, spraying liquid containing such ingredients onto can surfaces carrying milk components, directing the resulting foam with the liquid to said pool where said foam body collects upon the top of said liquid, withdrawing wash liquid from below said top level and introducing the same under pressure onto surfaces of said can, returning such used liquid and the foam produced to said pool, rinsing the washed can with fresh hot water, and returning at least a portion of such hot water used in rinsing to said pool to cause said foam layer to overflow.

7. In a process for washing emptied milk cans containing milk components on the surfaces thereof, the steps of maintaining a pool of wash liquid containing ingredients in proper proportion to form with milk solids a foam when agitated, spraying liquid containing such ingredients on can surfaces containing milk components to form a foam, directing the liquid and foam, thus produced, to said pool where said foam body collects upon the top of said liquid, withdrawing wash liquid from below said top level and introducing the same under pressure onto surfaces of said can, returning used liquid and the foam produced to said pool, rinsing the washed can with hot water in the neighborhood of a boiling temperature, and returning hot rinse water from said operation to said pool to cause said foam layer to overflow.

8. In a process for washing emptied milk cans containing milk components on the surfaces thereof, the steps of maintaining a pool of wash water containing ingredients in proper proportion to form with milk solids when agitated a floating body, spraying liquid containing such ingredients on can surfaces containing milk components to form such body, directing the liquid body thus produced into said pool where said body collects upon the top of said liquid, withdrawing wash liquid from below said top level and introducing the same under pressure onto surfaces of said can, returning used liquid and the floating body produced to said pool, rinsing the washed can with hot water in the neighborhood of 200° F., and returning said hot water from said rinsing operation to said pool to cause said floating body to overflow.

HARRY D. LATHROP.
VERGIL SCHWARZKOPF.

REFERENCES CITED

The following references are of record in the file of this patent:

UNITED STATES PATENTS

| Number | Name | Date |
| --- | --- | --- |
| 1,512,918 | Forsgard | Oct. 28, 1924 |
| 1,633,396 | Clarin | June 21, 1927 |
| 1,642,419 | Loew | Sept. 13, 1927 |
| 1,732,552 | Chapman | Oct. 22, 1929 |
| 1,854,235 | Stoddard | Apr. 19, 1932 |
| 1,932,070 | Grant et al. | Oct. 24, 1933 |
| 1,950,630 | Ries | Mar. 13, 1934 |
| 2,006,085 | Lehmkuhl | June 25, 1935 |
| 2,057,286 | Ash | Oct. 13, 1936 |
| 2,070,487 | Lutz | Feb. 9, 1937 |
| Re. 20,490 | McLean et al. | Aug. 31, 1937 |
| 2,127,017 | Walker | Aug. 16, 1938 |
| 2,197,602 | Wolcott | Apr. 16, 1940 |
| 2,236,445 | Pfeiffer | Mar. 25, 1941 |
| 2,262,955 | Miller | Nov. 18, 1941 |
| 2,291,085 | Lehmkuhl et al. | July 28, 1942 |
| 2,338,689 | Parker et al. | Jan. 4, 1944 |

FOREIGN PATENTS

| Number | Country | Date |
| --- | --- | --- |
| 729,214 | France | Apr. 25, 1932 |